United States Patent [19]
McCloud

[11] 3,743,028
[45] July 3, 1973

[54] RIGHT AND LEFT HAND LAWN EDGER-TRIMMER

[76] Inventor: Chester V. McCloud, 2354 N. W. 18, Oklahoma City, Okla. 73107

[22] Filed: Sept. 7, 1971

[21] Appl. No.: 178,135

[52] U.S. Cl. .................. 172/15, 56/17.2, 56/256
[51] Int. Cl. .................. A01d 35/16, A01d 53/14
[58] Field of Search ........................ 172/13–18; 56/10.1, 17.1, 17.2, 256

[56] References Cited
UNITED STATES PATENTS

| | | | |
|---|---|---|---|
| 3,475,887 | 11/1969 | Price | 172/15 |
| 2,618,919 | 11/1952 | Hutchens | 56/256 |
| 3,292,351 | 12/1966 | Larson et al. | 56/17.2 |
| 3,055,438 | 9/1962 | Wood et al. | 172/15 |
| 3,079,743 | 3/1963 | Egley | 172/15 |
| 3,193,996 | 7/1965 | Wellborn | 56/256 |
| 3,192,693 | 7/1965 | Bergeson | 56/17.1 |
| 3,537,244 | 11/1970 | Hicks | 172/15 |
| 2,759,319 | 8/1956 | Smith | 56/256 |
| 2,538,230 | 1/1951 | Boggs | 172/16 |

Primary Examiner—Clyde I. Coughenour
Attorney—Robert K. Rhea

[57] ABSTRACT

A wheel supported frame supports an engine having a V-belt pulley connected to the respective opposing ends of its crank shaft. A V-belt, pulley and guard shielded cutting blade are mounted on respective ends of an axle journaled by a housing attached to one end of a rod which is supported, at its other end, at the forward respective right and left sides of the frame, by a bracket moved vertically by control means. Rear wheel axle mounting means permits individual lateral and vertical movement of the two rear wheels for horizontally supporting the frame adjacent a curb, or the like.

1 Claim, 7 Drawing Figures

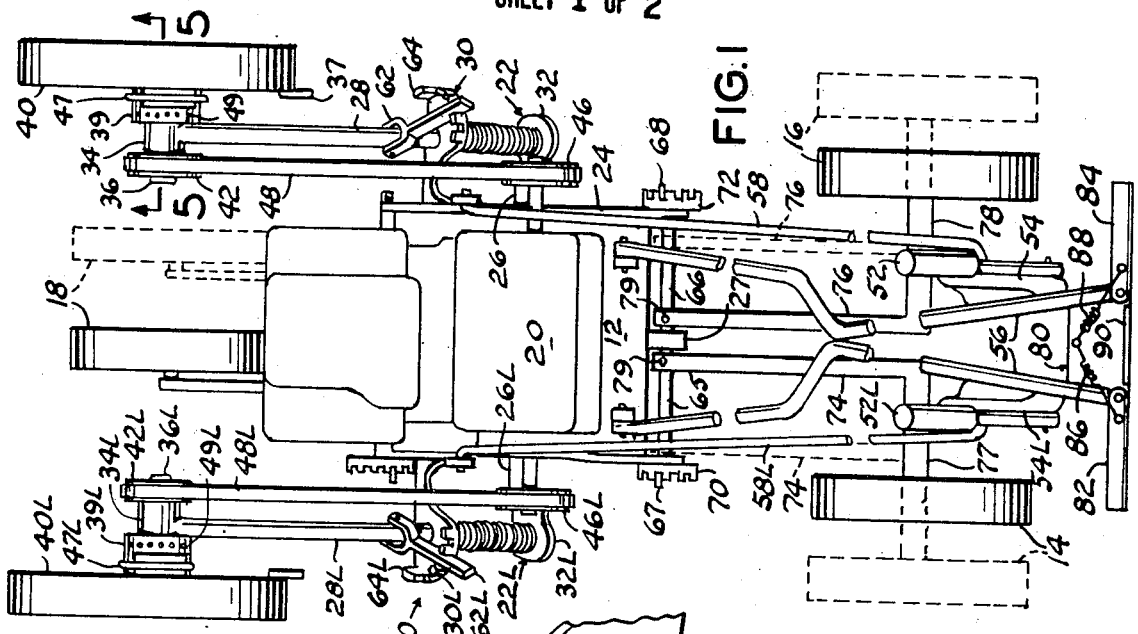
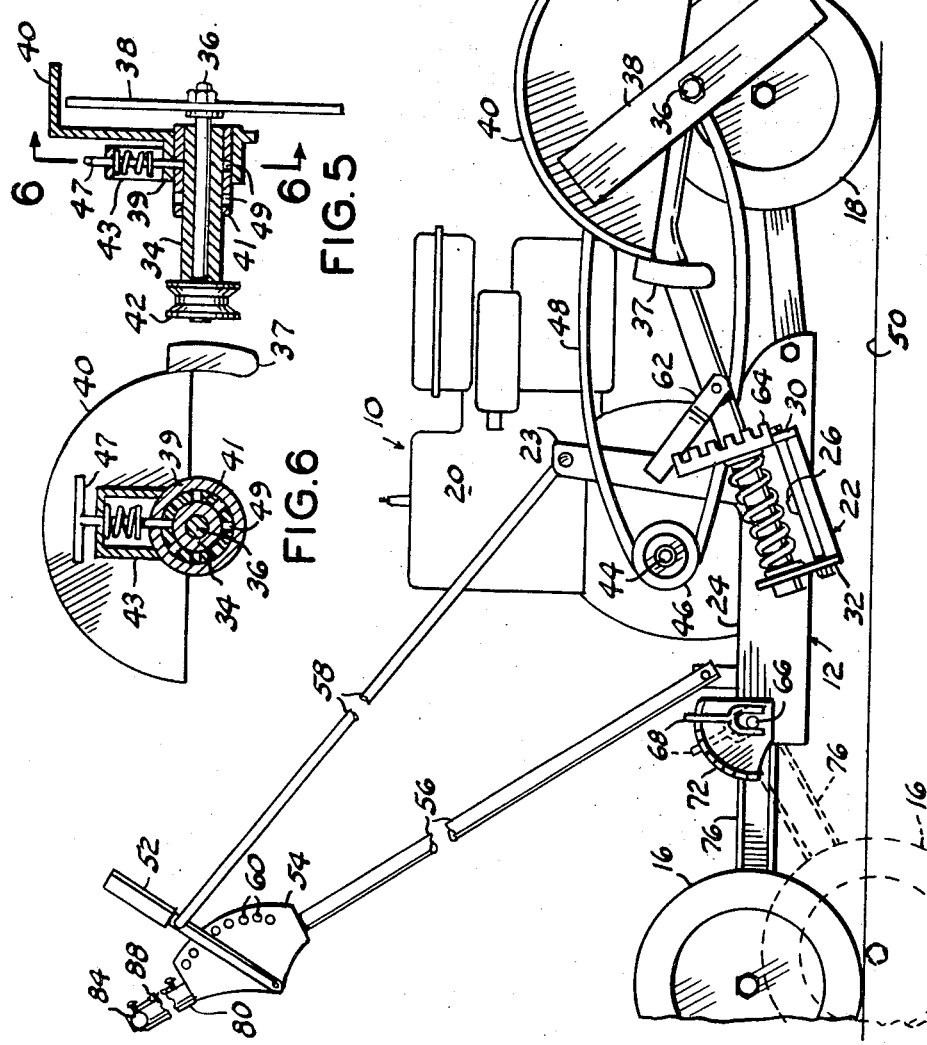

PATENTED JUL 3 1973
3,743,028
SHEET 2 OF 2
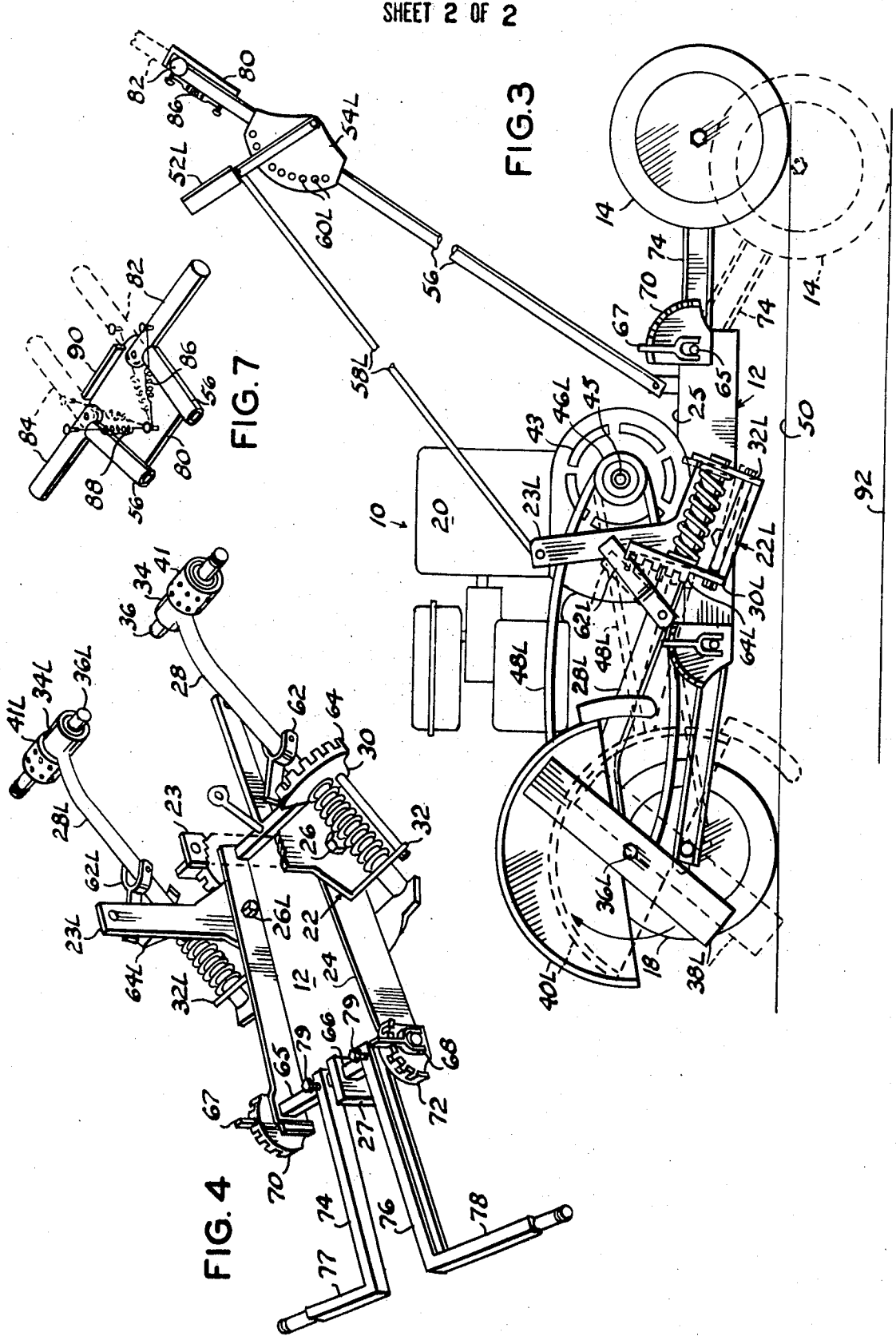

RIGHT AND LEFT HAND LAWN EDGER-TRIMMER

BACKGROUND OF THE INVENTION

1. Field of the invention.

The present invention relates to lawn edgers and trimmers and more particularly to an edger and trimmer having a lawn trimmer and turf cutting blade mounted at its forward end portion on both its right and left hand sides and further including vertically and horizontally adjustable rear wheels.

Powered lawn edgers and trimmers generally include a wheeled frame which supports a driven axle having a guard shielded trimmer or cutter blade which projects below the guard and is adapted to be positioned adjacent the edge of a concrete walk, or the like, to trim excess grass or weeds and cut a groove in the soil adjacent the concrete. However, most of the prior devices of this class are provided with only one such trimmer or cutter blade which is usually positioned on the right hand side of the front wheel or wheels. An edger as described above may be referred to as a "right hand" edger. Such a "right hand" edger is not capable of trimming all areas of walks or driveways around a home for the reason that, being only a right hand edger, it is physically impossible to place the edger in some restricted areas because of its size such as where the walk or drive terminates against or runs close to a building. One side of the walk or drive may be edged or trimmed in close proximity to the building, however, the opposite side of the walk or drive adjacent the building can be trimmed only as close as the length of the machine and its control handle will permit when the handle portion is positioned adjacent the building. Such areas must ordinarily be trimmed or edged by hand. Edgers and trimmers constructed to form a "left hand" edger or trimmer are similarly subject to the same but opposite restrictions.

2. Description of the prior art.

A right hand edger is disclosed by U.S. Pat. No. 3,079,743 and a selectively positioned right or left hand edger is disclosed by U.S. Pat. No. 3,075,338. Neither of these patents disclose a means for supporting that side of the edger projecting outwardly of the generally vertical plane or a curb when edging the lawn adjacent the curb. Furthermore, neither of these patents disclose a means for moving the control handles in a direction opposite a wall, such as a building, to permit the cutting blade to be positioned adjacent a walk, or the like, near a building so that the control handles do not contact the vertical surface of the wall.

SUMMARY OF THE INVENTION

A substantially horizontal mobile frame having a control handle supports a gasoline engine having the respective ends of its crank shaft connected with a V-belt pulley. A bearing supported axle, having a V-belt pulley mounted on one end, in alignment with the respective driven pulley and a trimming and cutting blade mounted on its other end, is journaled by a bearing equipped housing connected to the forwardly projecting end of a rod connected, at its other end, to the frame by a bracket pivotally mounted on the respective right and left hand sides of the forward portion of the frame. A control rod, connected with each respective bracket and connected at their other ends to a lever mounted on the control handle, pivots the respective bracket vertically about a horizontal axis, for lowering the trimming and cutting blades toward the surface of the earth whereby a V-belt entrained around the respective pairs of pulleys drives the respective trimming and cutting blade. These individual cutting blade controls thus permit the respective right or left hand cutting blade to be used for trimming and cutting grass and soil along restricted areas of walks or driveways not capable of being trimmed by a right hand edger.

Each rear wheel of the edger-trimmer is mounted on an L-shaped axle, each slidably connected with a respective one of an aligned pair of shafts selectively rotated for individual raising and lowering of the rear wheels.

The principal object of this invention is to provide a combination right and left hand edger and trimmer having vertically and horizontally adjustable rear wheels supporting the frame of said edger-trimmer horizontal while trimming along a curb, or the like.

BRIEF DESCRIPTION OF THE DRAWINGS

FIG. 1 is a fragmentary top view of the right and left hand edger and trimmer illustrating lateral movement of the rear wheels by dotted lines;

FIG. 2 is a fragmentary elevational right side view of FIG. 1 illustrating the right rear wheel vertical movement by dotted lines;

FIG. 3 is a fragmentary elevational left side view of FIG. 1 illustrating vertical movement of the cutter blade means and left rear wheel by dotted lines;

FIG. 4 is a perspective view illustrating the manner of connecting right and left hand cutter blades and rear wheel axles to the frame;

FIG. 5 is a vertical cross-sectional view, to an enlarged scale, taken substantially along the line 5—5 of FIG. 1;

FIG. 6 is a vertical cross-sectional view, partially in elevation, taken substantially along the line 6—6 of FIG. 5; and, FIG. 7 is a fragmentary perspective view of the adjustably positioned handle bars.

DESCRIPTION OF THE PREFERRED EMBODIMENT

Like characters of reference designate like parts in those figures of the drawings in which they occur.

In the drawings:

Referring more particularly to FIGS. 1, 2 and 4, the reference numeral 10 indicates an edger-trimmer, as a whole, comprising a frame 12 having rear wheels 14–16 and a front wheel 18 which supports an engine 20. A bracket 22, having an upstanding arm 23, is pivotally connected to an upstanding wall 24 at the right side of the frame, as viewed in FIGS. 1 and 4, by a bolt 26 which permits vertical pivoting movement of the bracket about the horizontal axis of this bolt. An elongated rod 28 extends through and is journaled at one end portion by spaced-apart end portions 30 and 32 of the bracket. The other end of the rod 28 is connected with a housing 34 forming a bearing which journals an axle 36. A cutter blade 38 is connected with one end of the axle 36. A substantially semicircular guard or shield 40, having a walk edge engaging guide arm 37, is supported by the housing 34. The other end of the axle 36 has connected thereto a V-belt pulley 42. The right hand end portion of the engine crank shaft 44, as viewed in FIG. 1, has a V-belt pulley 46 secured thereto in cooperative alignment with the pulley 42 for receiving a V-belt 48. In the upwardly disposed position of the cutter blade, as shown by solid lines (FIG. 2), the V-belt 48 is out of driving contact with the pulley 42. When the bracket top end 23 is pivoted forwardly for lowering the cutting blade into contact with the surface of the earth, indicated by the line 50, the V-belt 48 is in driving contact with the pulley 42 which rotates the blade 38 in the direction shown by the arrow. This lowering action of the cutting blade is accomplished by a lever 52 which is pivotally mounted on a lever bracket 54 connected with frame control handles 56 which are connected at one end with the rearward portion of the frame 12 and project rearwardly and upwardly therefrom. A rod 58 extends between and is pivotally connected at its respective ends with the lever 52 and the upstanding bracket arm 23. Thus vertical pivoting movement of the lever 52 pivots the bracket 22 about the horizontal axis of the bolt 26 and in turn raises and lowers the cutting blade supporting housing 34. Thus the cutting blade 38 may be moved and held in a selected position, by means of a pin on the lever 52 removably entering one of a series of apertures 60 formed in the lever bracket 54 which in turn moves the axis and cutting blade supporting housing from its idle position, shown in FIG. 2, to a maximum cutting blade soil penetrating position.

FIGS. 1 and 2 illustrate the position of the cutter blade 38 for rotation in a plane perpendicular with respect to the horizontal surface of the earth, however, the plane of the blade may be tilted or rotated about the axis of the rod 28 by a pawl 62 having a yoke end portion pivotally connected with the rod 28 and having its opposite end portion selectively positioned manually between any two teeth in a toothed arcular flange 64 forming a part of the bracket 22.

The above description is conventional with this type of an edger and trimmer and is set forth to show the relationship of my improvement to such an edger and trimmer.

Referring also to FIGS. 5 and 6, the shield 40 is mounted on a sleeve 39 which surrounds one end portion of the housing 34 with a bushing 41 interposed between the sleeve 39 and housing 34. A spring urged lock pin 47 is secured, by a box-like bracket 43, to the sleeve 39 for removably entering any one of a plurality of apertures 49 formed in a circumferential row around the bushing 41 for angular adjustment of the shield 40 to prevent the cutter blade 38 from throwing soil or rocks upwardly during the trimming and edging action.

The following reference numerals having the suffix L are substantially mirror images of the above described same numbered parts.

In carrying out the invention, and referring also to FIG. 3, a bracket 22L, having an upstanding arm 23L, is pivotally connected to an upstanding wall 25 at the left side of the frame, as viewed in FIGS. 1 and 4, by a bolt 26L which permits vertical pivoting movement of the bracket about the horizontal axis of this bolt. An elongated rod 28L extends through and is journaled at one end portion by spaced-apart end portions 30L and 32L of the bracket. The other end of the rod is connected with a housing 34L which similarly journals an axle 36L. A cutter blade 38L is connected with one end of the axle 36L. A substantially semicircular guard or shield 40L is similarly mounted on a sleeve 39L surrounding one end portion of the housing 34L. A spring urged lock pin 47L is similarly secured to the sleeve 39L for removably entering any one of a plurality of apertures 49L formed in a circumferential row around the bushing 41L. The other end of the axle 36L has connected thereto a V-belt pulley 42L. The left hand end portion of the engine crank shaft, as viewed in FIG. 1, is normally provided with cranking means 43. This cranking means is centrally drilled and a stub shaft 45 is coaxially connected with the engine crank shaft. The stub shaft 45 has secured thereto a V-belt pulley 46L cooperatively aligned with the pulley 42L for receiving a V-belt 48L. The upwardly disposed position of the cutter blade 38L, as shown by solid lines in FIG. 3, places the V-belt 48L out of driving contact with the pulley 42L. The bracket 22L is pivoted for lowering the cutting blade 38L into contact with the surface of the earth, indicated by the line 50, as shown by dotted lines, and tightening the belt 48L for rotating the blade 38L in the direction shown by the arrow in the manner described hereinabove for the cutter blade 38. This is accomplished by a lever 52L which is pivotally mounted on a lever bracket 54L connected with the control handles 56 opposite the bracket 54 and lever 52. Similarly a rod 58L extends between and is pivotally connected at its respective ends with the lever 52L and the upstanding bracket arm 23L. Thus vertical pivoting movement of the lever 52L pivots the bracket 22L about the horizontal axis of the bolt 26L and in turn raises and lowers the cutting blade supporting housing 34L. The cutting blade 38L may similarly be moved and held in a selected position by means of a pin on the lever 52L entering one of the series of apertures 60L formed in the lever bracket 54L.

FIGS. 1 and 3 illustrate the position of the cutter blade 38L for rotation in a plane perpendicular with respect to the horizontal surface of the earth, however, the plane of the blade may be tilted or rotated about the axis of the rod 28L by a pawl 62L having a yoke end portion pivotally connected with the rod 28L and having its opposite end portion selectively positioned manually within notches formed in a similar arcular toothed flange 64L forming a part of the bracket 22L.

The rearward end portion of the frame is provided with a pair of transverse coaxially aligned rotatable stub shafts 65 and 66, each journaled at one end by a frame ear 27 and journaled, at their other ends, respectively, by arcular toothed plates 70 and 72 secured to respective rearward side surfaces of the frame 12. Pawls 67 and 68 are respectively connected with the laterally directed ends of the stub shafts 65 and 66 and are adjustably nested between any two teeth on the respective arcular plates 70 and 72 for rotating the respective stub shaft about its horizontal axis. Intermediate their ends the stub shafts 65 and 66 are preferably square or polygonal-shaped in cross section. A pair of L-shaped axles, each having a leg portion 74–76 and a foot portion 77–78 have the respective wheels 14 and 16 journaled by the respective free end portion of the axle foot portions 77 and 78. The free end portion of each axle leg 74 and 76 is transversely cooperatively apertured for surrounding an intermediate portion of each stub shaft and are connected by set screws 79 to the respective stub shaft 65 and 66 for lateral adjustment along the respective stub shaft to move the respective wheel 14 and 16 laterally of the longitudinal axis of the frame 12. Selective adjustment of the pawls 67 and 68 positions the respective axle leg portion 74 and 76 in a common horizontal plane for supporting the edger-trimmer on a horizontal surface.

Referring more particularly to FIG. 7, a handle bar plate 80 extends between and is connected with the upper end portions of the handles 56. A pair of handle guide bars 82 and 84 are pivotally connected, respectively at one end portion in coaxial aligned relation to respective side portions of the handle bar plate 80 for pivoting movement between a normal laterally directed position and a rearwardly directed position parallel with the direction of travel. A pair of springs 86 and 88 are each connected, at one end, to a central forward portion of the handle bar plate 80 and are respectively connected, at their other ends, to an intermediate portion of the handle guide bars 82 and 84. The respective rearward end surface of the handles 56 form stops for maintaining the handle guide bars in a laterally directed position while an upstanding transverse flanged edge 90, formed on the handle bar plate 80, forms stops for maintaining the handle guide bars 82 and 84 in a rearward directed position.

OPERATION

The operation of the device is substantially identical for lowering either of the cutter blades 38 or 38L. The respective cutter blades are initially in raised position as shown. The engine is started and the respective lever 52 or 52L is manually pivoted toward the forward end of the device which pivots the respective bracket 22 or 22L to lower the housing 34 or 34L so that the respective cutter blade engages the surface of the earth 50. With the respective cutter blade lowered the edger and trimmer 10 is manually moved forwardly along the edge of a walk or drive, not shown, by means of the control handles 56. When neither of the cutting blades 38 or 38L are in use, they are lifted by the respective lever 52 or 52L to the solid line position of FIGS. 2 and 3 wherein the respective cutter blades are positioned out of contact with the surface of the earth 50 and are inoperative by reason of the slack or looseness of the respective V-belt. When trimming along a curb, or the like, a selected one of the rearward L-shaped axle leg portions 74 or 76 is adjusted laterally along its supporting stub shaft to position the wheel laterally beyond and parallel with the curb. The wheel is then lowered with respect to the horizontal plane of the frame by moving the respective pawl 67 or 68 and angularly rotating the stub axle so that the axle leg portion extends rearwardly downward to position the wheel in contact with the street-level surface 92 adjacent the curb.

When the edger is used in trimming the turf adjacent a vertical structure, such as a building wall, the respective left or right handle guide bar 82 or 84 is pivoted about its connection with the handle plate 80 to the position shown by dotted lines (FIG. 7) thus providing manual control of the edger and positioning the respective handle guide bar in an out-of-the-way position with respect to the vertical plane of the wall.

Obviously the invention is susceptible to some change or alteration without defeating its practicability, and I therefore do not wish to be confined to the preferred embodiment shown in the drawings and described herein.

I claim:

1. In a lawn edger and trimmer having a base frame, a forward wheel and rearward wheels for supporting said frame in a horizontal plane defining a right hand and a left hand side for said edger and trimmer, an engine mounted on said frame, said engine having a crank shaft projecting outwardly from opposing ends of the engine and disposed transversely of the direction of travel of said edger and trimmer, bracket and cutter blade means mounted on the respective right hand and left hand sides of said frame for vertical movement toward and away from the surface of the earth, said bracket and cutter blade means including a cutter support rod extending forwardly of said frame and having a bearing journalling a stub axle connected with a turf cutting blade, and a semicircular cutting blade shield supported by the stub axle bearing, belt and pulley means drivably connecting said cutter blade means with the respective end portions of said crank shaft, and handle guiding means, the improvement comprising:

wheel mounting means connecting said rearward wheels to the respective right hand and left hand rearward end portion of said frame for vertical movement of said rearward wheels about a common horizontal axis independently of each other, said wheel mounting means including normally substantially horizontally disposed right hand and left hand axles, each having a leg portion and a foot portion, the foot portion of each said axle journalling the respec-tive said wheel;

pivotable shaft means extending transversely of said frame and connected with the respective axle leg portion, said pivotable shaft means including, right and left hand coaxially aligned shafts, each having a polygonal periphery intermediate its ends, the leg portion of each said axle having a like polygonal-shaped aperture cooperatively surrounding a peripheral portion of the respective said shaft intermediate its ends for lateral adjustment of the respective said axle with respect to the longitudinal axis of said frame, a toothed arcuate plate secured to the respective sides of the rearward end portion of said frame and respectively journalling the laterally directed end portion of each said shaft, and, a pawl pivotally secured to the laterally directed end portion of each said shaft outwardly of the respective said toothed plate and being engageable, intermediate its ends, between any two teeth of the respective said toothed plates for selectively disposing the depending peripheral portion of either of said rearward wheels on a horizontal supporting plane spaced below the horizontal supporting plane of the other wheels, a sleeve surrounding and interposed between the stub axle bearing and the semicircular shield, said sleeve having a peripheral row of spaced-apart apertures;

a box-like bracket secured to the semicircular shield opposite said blade; and, a spring urged pin projecting through said box-like bracket and engaging one of the sleeve apertures.

* * * * *